(12) United States Patent
Ishimaru

(10) Patent No.: US 7,556,171 B2
(45) Date of Patent: Jul. 7, 2009

(54) TANK

(75) Inventor: Hirokazu Ishimaru, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 158 days.

(21) Appl. No.: 11/280,451

(22) Filed: Nov. 17, 2005

(65) Prior Publication Data

US 2007/0111579 A1    May 17, 2007

(51) Int. Cl.
*F17C 1/02* (2006.01)
(52) U.S. Cl. .................. 220/586; 220/581; 220/601
(58) Field of Classification Search .......... 220/581, 220/586, 588–590, 495.08, 601, 661, 560.04; 277/622; 439/312
See application file for complete search history.

(56) References Cited

U.S. PATENT DOCUMENTS

| | | | | |
|---|---|---|---|---|
| 3,319,658 | A | * | 5/1967 | Mercier ........................ 138/30 |
| 4,925,044 | A | * | 5/1990 | Hembert ...................... 220/589 |
| 5,004,120 | A | * | 4/1991 | Hembert ...................... 220/589 |
| 5,253,778 | A | * | 10/1993 | Sirosh ......................... 220/590 |
| 5,287,988 | A | * | 2/1994 | Murray ........................ 220/589 |
| 5,429,845 | A | * | 7/1995 | Newhouse et al. .......... 428/34.1 |
| 5,476,189 | A | * | 12/1995 | Duvall et al. ................ 220/590 |
| 5,494,188 | A | | 2/1996 | Sirosh |
| 5,518,141 | A | * | 5/1996 | Newhouse et al. .......... 220/586 |
| 5,538,680 | A | | 7/1996 | Enders |
| 5,551,590 | A | * | 9/1996 | Mazur et al. ............. 220/23.83 |
| 5,839,600 | A | * | 11/1998 | Moreira et al. ......... 220/560.04 |
| 5,938,209 | A | * | 8/1999 | Sirosh et al. ................ 277/622 |
| 5,979,692 | A | | 11/1999 | West |
| 6,135,308 | A | * | 10/2000 | Fang ........................... 220/590 |
| 6,227,402 | B1 | * | 5/2001 | Shimojima et al. .......... 220/581 |
| 6,230,922 | B1 | * | 5/2001 | Rasche et al. ............... 220/586 |
| 6,510,959 | B1 | * | 1/2003 | Van Newenhizen ........ 220/4.12 |
| 7,032,769 | B2 | * | 4/2006 | Iida et al. .................... 220/591 |
| 7,169,214 | B2 | * | 1/2007 | Kubo et al. ................... 96/108 |
| 2004/0173618 | A1 | * | 9/2004 | Suzuki et al. ............... 220/581 |

FOREIGN PATENT DOCUMENTS

| | | |
|---|---|---|
| JP | 2000-161590 | 6/2000 |
| JP | 2002-349796 | 12/2002 |
| JP | 2003-247696 | 9/2003 |
| JP | 2005-048918 | 2/2005 |
| JP | 2005-048919 | 2/2005 |

* cited by examiner

*Primary Examiner*—Anthony D Stashick
*Assistant Examiner*—Christopher B McKinley
(74) *Attorney, Agent, or Firm*—Kenyon & Kenyon LLP

(57) ABSTRACT

In a high-pressure tank, an adjacent part of a liner and a protruded part of a cap are provided adjacently to each other, and in respective annular grooves in the protruded part, an O-ring for sealing adjacent portions of the adjacent part and the protruded part is loaded. A backup ring provided in the inside of the adjacent part of the liner has a hardness higher than that of the liner. Therefore, deformation of the adjacent part that would be caused by the respective O-rings is suppressed, and the respective O-rings can be sufficiently compressed, whereby reliable sealing between the liner and the cap can be provided. In addition, when the pressure inside of the high-pressure tank is increased to a high pressure, even if the cap is pushed out toward the outside resulting in the protruded part of the cap being shrinkage-deformed toward the inside in the radial direction due to the stresses, the respective O-rings can maintain the state of sealing between the protruded part and the adjacent part.

15 Claims, 9 Drawing Sheets

TANK

CROSS-REFERENCE TO RELATED APPLICATION

This application claims priority under 35 USC 119 from Japanese Patent Application No. 2003-283600, the disclosure of which is incorporated by reference herein.

BACKGROUND OF THE INVENTION

1. Field of the Invention

The present invention relates to a tank in which a seal member seals the adjacent portions of a pair of adjacent members.

2. Description of the Related Art

As a tank, a pressure vessel in which the inlay part of an auxiliary component is inlaid in an opening part formed in a liner made of synthetic resin, and a self-tightening seal material is used for sealing between the opening part of the liner made of synthetic resin and the inlay part of the auxiliary component is available (for example, refer to Japanese Patent Application Laid-Open No. 2000-161590).

In this pressure vessel, the inlay part of the auxiliary component is provided with an outward protruded part on the outside of the pressure vessel, and the outward protruded part of the auxiliary component is held between the liner made of synthetic resin and a helical layer formed on the external surface of the liner made of synthetic resin.

However, in this pressure vessel, the hardness of the liner made of synthetic resin is low. Therefore, there occurs a problem in that the liner made of synthetic resin is deformed by the self-tightening seal material, resulting in the self-tightening seal material being substantially not compressed, and thus reliable sealing between the liner made of synthetic resin and the auxiliary component cannot be provided.

Moreover, when the pressure inside of the pressure vessel is increased to a high pressure, the auxiliary component is pushed out toward the outside of the pressure vessel, resulting in the inlay part of the auxiliary component being shrinkage-deformed toward the inside in the radial direction due to the stresses. Therefore, a problem arises in that the self-tightening seal material is further prevented from being compressed, and thus reliable sealing between the synthetic resin liner and the auxiliary component is even more difficult to ensure.

SUMMARY OF THE INVENTION

The present invention has been made in view of the above circumstances, and the purpose of the present invention is to obtain a tank which can provide reliable sealing between a pair of adjacent members.

A first aspect of the present invention is to provide a tank, including: a pair of adjacent members which are provided adjacently to each other; a seal member which has elasticity and seals the adjacent portions of the pair of adjacent members; and a high-hardness part which is provided at least one of the pair of adjacent members at the adjacent portions of the pair of adjacent members, and has a hardness higher than that of the at least one of the pair of adjacent members.

A second aspect of the present invention is to provide the tank according to the first aspect, further including a support part which is provided at least one of the pair of adjacent members on an opposite side of the high-hardness part from the seal member, and has a hardness higher than that of the at least one of the pair of adjacent members.

A third aspect of the present invention is to provide the tank according to one of the first and second aspects, wherein the high-hardness part is in contact with the seal member.

A fourth aspect of the present invention is to provide the tank according to one of the first and second aspects, wherein, when the pair of adjacent members are relatively deformed in a direction in which they are separated from each other at the adjacent portions, the seal member maintains the sealing state at the adjacent portions of the pair of adjacent members.

A fifth aspect of the present invention is to provide the tank according to the fourth aspect, wherein an outer circumferential part constituting a circumferential wall and a protruded part, which is protruded from the outer circumferential part toward the inside, are provided at one of the pair of adjacent members; an adjacent part which is adjacent to the protruded part at the outer circumference is provided at the other of the pair of adjacent members; and by internal pressure, the protruded part is deformed in a direction in which it is separated from the adjacent part.

A sixth aspect of the present invention is to provide the tank according to one of the first and second aspects, wherein one of the pair of adjacent members constitutes an opening of a circumferential wall, and the other of the pair of adjacent members constitutes an internal surface of the circumferential wall.

In a seventh aspect of the present invention, the cap protrudes at the tank interior, and an acting direction of tank internal pressure acting on an internal seal portion of the liner is a radial direction of a valve cross section in which the valve is tightened.

In a eighth aspect of the present invention, the valve has two types of regions whose cross sectional areas viewed in an axial direction are different from each other, and a valve cross sectional area of a portion at which the valve and the cap are sealed is smaller than a valve cross sectional area of a portion at which the valve and the cap are screwed together.

In the tank of the first aspect of the present invention, a pair of adjacent members are provided adjacently to each other, and a seal member which seals the adjacent portions of the pair of adjacent members is provided.

Herein, the high-hardness part which is provided at least one of the pair of adjacent members at the adjacent portions of the pair of adjacent members has a hardness higher than that of the at least one of the pair of adjacent members. Therefore, the seal member can be sufficiently compressed, and thus reliable sealing between the pair of adjacent members can be provided.

In the tank of the second aspect of the present invention, since the support part which is provided at least one of the pair of adjacent members on the opposite side of the high-hardness part from the seal member has a hardness higher than that of the at least one of the pair of adjacent members, the seal member can be even more sufficiently compressed, and thus reliable sealing between the pair of adjacent members can be further provided.

In the tank of the third aspect of the present invention, since the high-hardness part is in contact with the seal member, the seal member can be positively and sufficiently compressed, and thus reliable sealing between the pair of adjacent members can be provided.

In the tank of the fourth aspect of the present invention, when the pair of adjacent members are relatively deformed in the direction in which they are separated from each other at the adjacent portions, the seal member maintains the sealing state at the adjacent portions of the pair of adjacent members, and thus reliable sealing between the pair of adjacent members can be provided.

In the tank of the fifth aspect of the present invention, the protruded part protrudes from the outer circumferential part constituting the circumferential wall at one of the pair of adjacent members toward the inside; and the adjacent part which is provided at the other of said pair of adjacent members is adjacent to said protruded part at the outer circumference. Herein, when, by the internal pressure, the protruded part is deformed in the direction in which it is separated from the adjacent part, the seal member maintains the sealing state at the adjacent portions of the protruded part and the adjacent part, and thus reliable sealing between the pair of adjacent members can be provided.

In the tank of the sixth aspect of the present invention, reliable sealing between the adjacent member constituting the opening of the circumferential wall, and the adjacent member constituting the internal surface of the circumferential wall can be provided.

In the tank of the seventh aspect of the present invention, since the liner is pressed by the tank internal pressure at the valve side, sealability is improved.

Further, from the standpoint of fastening of the valve to the cap, a larger valve cross sectional area obtains a greater tightening force and is thus advantageous. On the other hand, from the standpoint of the seal between the valve and the cap, a smaller internal diameter of the sealing portion results in a smaller internal pressure acting on the sealing portion and is thus advantageous. Thus, the tank of the eighth aspect of the present invention is a favorable configuration for both of these considerations.

DETAILED DESCRIPTION OF THE INVENTION

First Embodiment

Figure 1:
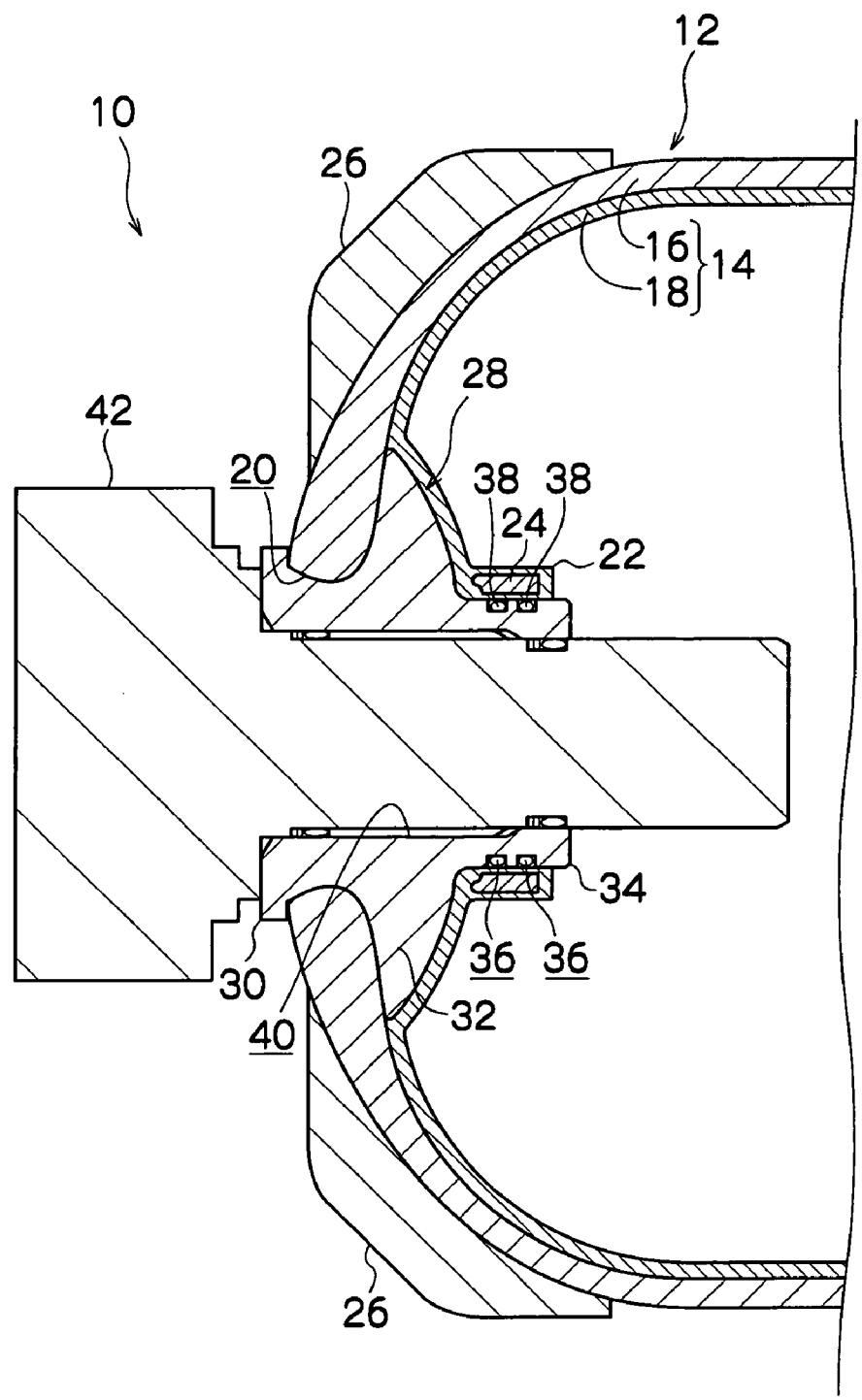
FIG. 1 is a sectional view of the main portion of a high-pressure tank pertaining to a first embodiment of the present invention.

FIG. 1 is a sectional view of the main portion of a high-pressure tank 10 pertaining to a first embodiment which has been configured by application of the tank of the present invention. In the present embodiment (as well as in a second embodiment and a third embodiment described later), the outside of the high-pressure tank 10 is referred to as "outside", and the inside of the high-pressure tank 10 is referred to as "inside".

The high-pressure tank 10 pertaining to the present embodiment is for filling the inside thereof with a gas (a gas, such as hydrogen, helium, or the like) for storage, comprising a tank main body 12 having a container-like shape. A circumferential wall 14 of the tank main body 12 is configured by integrating an outer circumferential wall 16 on the outside and a liner 18 (a plastic liner) on the inside as an adjacent member except for the area around a through-hole 20 described later, the outer circumferential wall 16 being made of FRP (fiber reinforced plastic), and the liner 18 being made of PA (polyamide) 12 ("3030JI7" manufactured by UBE INDUSTRIES, LTD.).

In the circumferential wall 14 of the tank main body 12, a through-hole 20 having a substantially columnar shape is formed, and due to the outer circumferential wall 16 and the liner 18 being separated from each other in the area around the through-hole 20, a gap formed in the shape of a torus with a triangular cross-sectional geometry is provided between the outer circumferential wall 16 and the liner 18. In the liner 18, an adjacent part 22 in the shape of a cylinder is formed as an integral part thereof, the adjacent part 22 constituting the inner end portion of the through-hole 20. In the inside of the adjacent part 22, a backup ring 24 in the shape of a cylinder as a high-hardness part is provided by insert molding, the backup ring 24 being made of a metal (for example, a stainless steel (SUS 316L)) for providing a hardness higher than that of the liner 18.

On the outer circumferential surface of the circumferential wall 14 of the tank main body 12, a predetermined number of plate-like cushioning materials 26 are provided in the vicinity of the through-hole 20.

The tank main body 12 has a cap 28 formed in a substantially cylindrical shape as an adjacent member that is made of a metal (for example, a stainless steel (SUS 316L)). At the outer end of the cap 28, a flange part 30 is protruded, the flange part 30 being formed in the shape of a torus with a rectangular cross-sectional geometry. In the intermediate portion in the direction of inside to outside of the cap 28, an outer circumferential part 32 is protruded, the outer circumferential part 32 being formed in the shape of a torus with a triangular cross-sectional geometry. Further, the inner end portion of the cap 28 forms a protruded part 34, the protruded part 34 being protruded inward from the outer circumferential part 32.

The cap 28 is fitted into the through-hole 20 of the circumferential wall 14, with the portion from the flange part 30 to the outer circumferential part 32 of the cap 28 constituting the circumferential wall 14, and between the flange part 30 and the outer circumferential part 32 of the cap 28, the outer circumferential wall 16 of the circumferential wall 14 is held, with the outer circumferential part 32 of the cap 28 being held between the outer circumferential wall 16 and the liner 18 of the circumferential wall 14. In addition, the protruded part 34 of the cap 28 is provided adjacently to the adjacent part 22 of the liner 18, being in contact therewith.

In the outer circumferential surface of the protruded part 34 of the cap 28, a pair of annular grooves 36, which are formed in the shape of a torus with a rectangular cross-sectional geometry, are formed along the entire circumference, and in the respective annular grooves 36, an O-ring 38 as a seal member that is formed in the shape of a torus with a circular cross-sectional geometry is inserted so as to be loaded therein.

Figure 2:
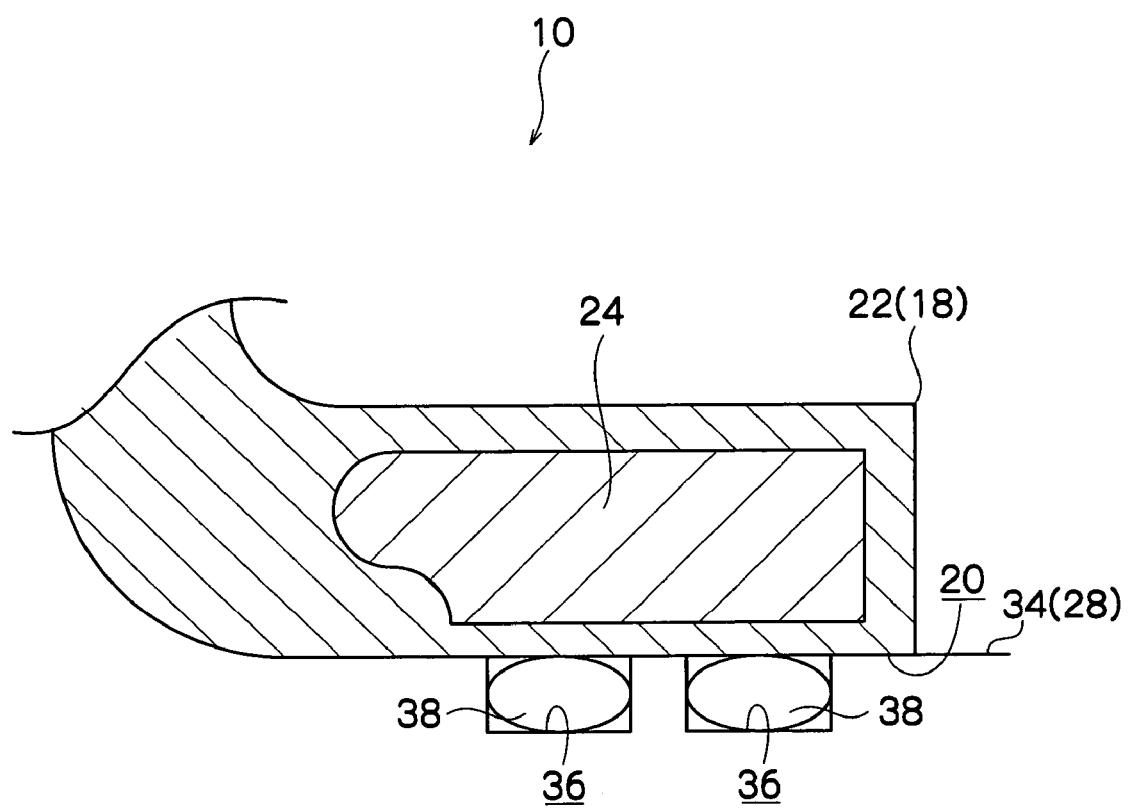
FIG. 2 is a sectional view illustrating the sealing state of the high-pressure tank pertaining to the first embodiment of the tank of the present invention.

As shown in FIG. 2 in detail, the respective O-rings 38 are made of a rubber (for example, nitrile rubber), having elasticity, and the respective O-rings 38 are held between the bottom surface of the annular grooves 36 and the inner circumferential surface of the adjacent part 22 of the liner 18, in an elastically deformed state, for sealing between the liner 18 and the cap 28. As a result, the gas in the high-pressure tank 10 is prevented from leaking out between the liner 18 and the cap 28.

In the cap 28, an opening 40 having a substantially columnar shape is provided. In other words, in the circumferential wall 14 of the tank main body 12, an opening 40 is provided. To the cap 28, a valve 42 (an intank valve) having a substantially columnar shape is fastened (screwed in) at the opening 40, the valve 42 closing the opening 40 of the cap 28. In the valve 42, a drain hole (not shown) is formed, and the drain hole communicates between the inside of the high-pressure tank 10 and the outside of the high-pressure tank 10, being capable of opening and shutting. The drain hole is normally closed, and when the drain hole is opened, the gas inside the high-pressure tank 10 is drained to the outside of the high-pressure tank 10.

Figure 3:
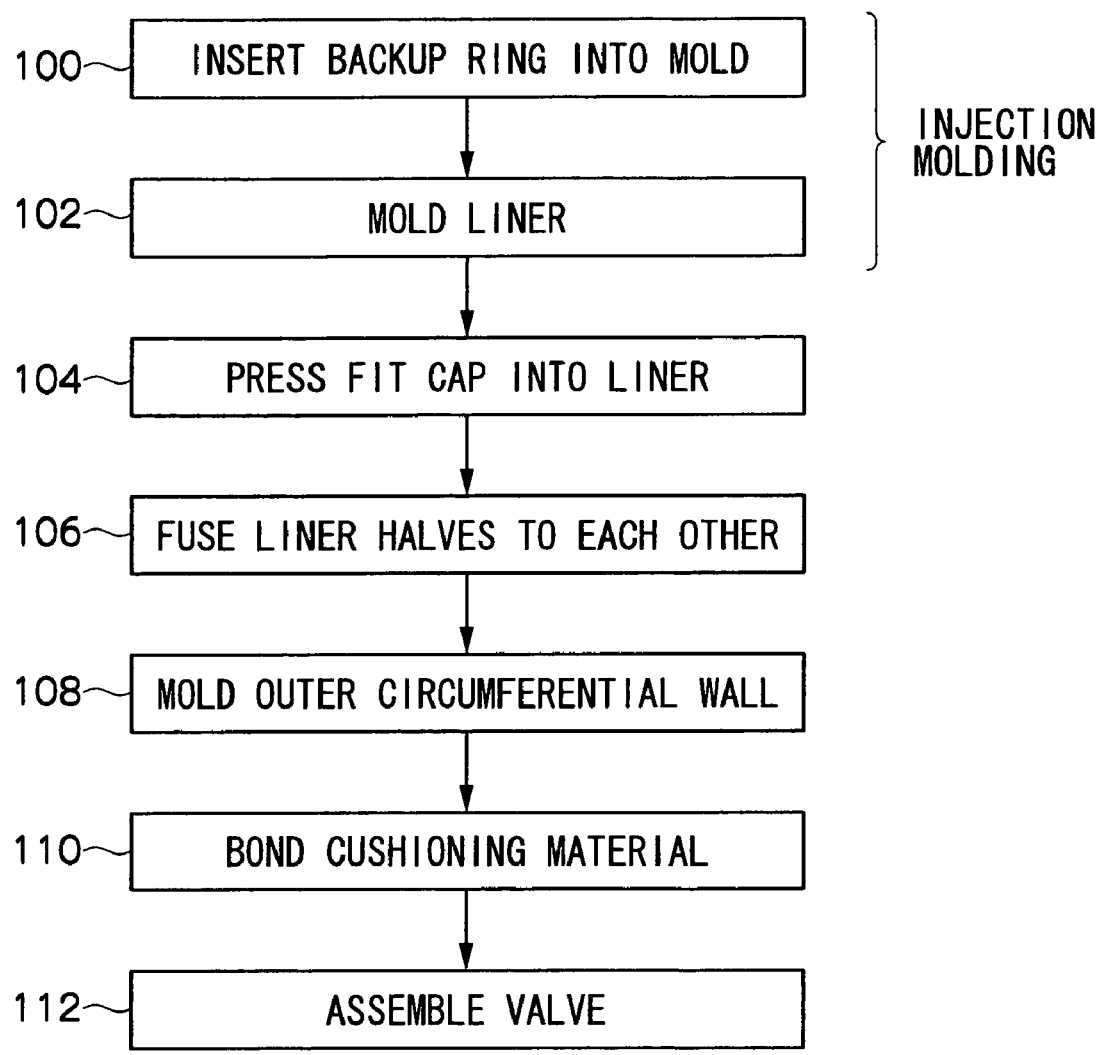
FIG. 3 is a flowchart illustrating the procedure for manufacturing the high-pressure tank pertaining to the first embodiment of the present invention.

The high-pressure tank 10 pertaining to the present embodiment is manufactured by the procedure illustrated in the flowchart in FIG. 3.

Particularly, at step 100, the backup ring 24 divided into two halves is inserted into a liner molding mold for molding the liner 18 in two halves; and at step 102, by injecting the molten resin into the mold for liner molding, the liner 18 divided into two halves is molded. In addition, this liner 18 divided into two halves is molded as a pair.

Next, at step 104, into the inside of the adjacent part 22 configured by combining the pair of halves of the liner 18 divided into two, the protruded part 34 of the cap 28 with which the O-ring 38 is loaded in the respective annular grooves 36 is press-fitted to cause the outer circumferential part 32 of the cap 28 to be butted against the liner 18 in the vicinity of the adjacent part 22; and at step 106, the pair of halves of the liner 18 divided into two are fused to each other for manufacture of the liner 18.

Further, at step 108, the outer circumferential wall 16 is formed on the circumference of the liner 18; at step 110, the predetermined number of cushioning materials 26 are bonded to the outer circumferential surface of the outer circumferential wall 16; and finally, at step 112, the valve 42 is assembled (fastened) to the opening 40 in the cap 28.

Next, the operation of the present embodiment will be described.

In the high-pressure tank 10 configured as described above, the adjacent part 22 of the liner 18 and the protruded part 34 of the cap 28 are provided adjacently to each other, and in the respective annular grooves 36 of the protruded part 34, the O-ring 38 for sealing the adjacent portions of the adjacent part 22 and the protruded part 34 is loaded.

Figure 4:
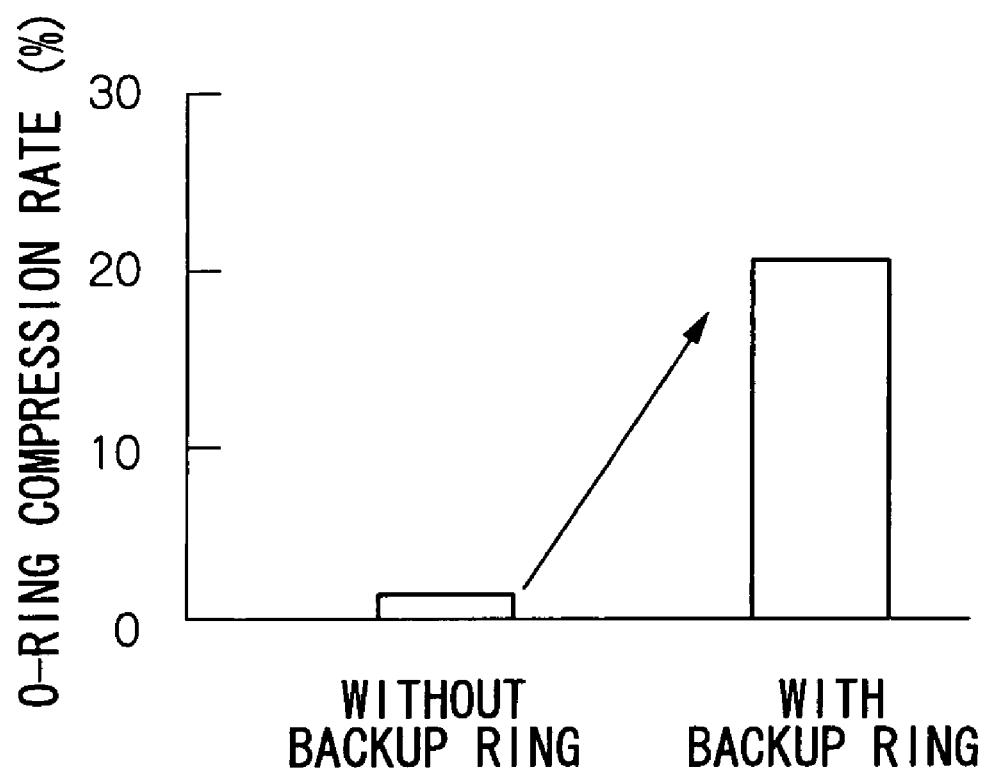
FIG. 4 is a graph showing the deformation rate for the respective O-rings in the high-pressure tank pertaining to a first embodiment of the present invention in comparison with that in a high-pressure tank where the backup ring is not provided in the liner.

Here, if the backup ring 24 were not provided at the adjacent part 22 as shown in FIG. 4, the respective O-rings 38 could not be sufficiently compressed (could not be compressed at a rate of compression that is required for sealing), because the adjacent part 22 would be deformed by the respective O-rings 38.

On the other hand, in the high-pressure tank 10, the backup ring 24 provided at the adjacent part 22 of the liner 18 has a hardness higher than that of the liner 18. Therefore, the deformation of the adjacent part 22 that would be caused by the respective O-rings 38 is suppressed, the respective O-rings 38 can be sufficiently compressed (with a rate of compression of the respective O-rings 38 being as high as 20%), and thus reliable sealing between the liner 18 and the cap 28 can be provided.

In addition, when the pressure inside of the high-pressure tank 10 is increased to a high pressure, even if the valve 42 and the cap 28 are pushed out toward the outside, resulting in the protruded part 34 of the cap 28 being shrinkage-deformed toward the inside in the radial direction due to the stresses, the respective O-rings 38 can maintain the state of sealing between the protruded part 34 and the adjacent part 22. Therefore, reliable sealing between the liner 18 and the cap 28 can still be provided.

Second Embodiment

Figure 5:
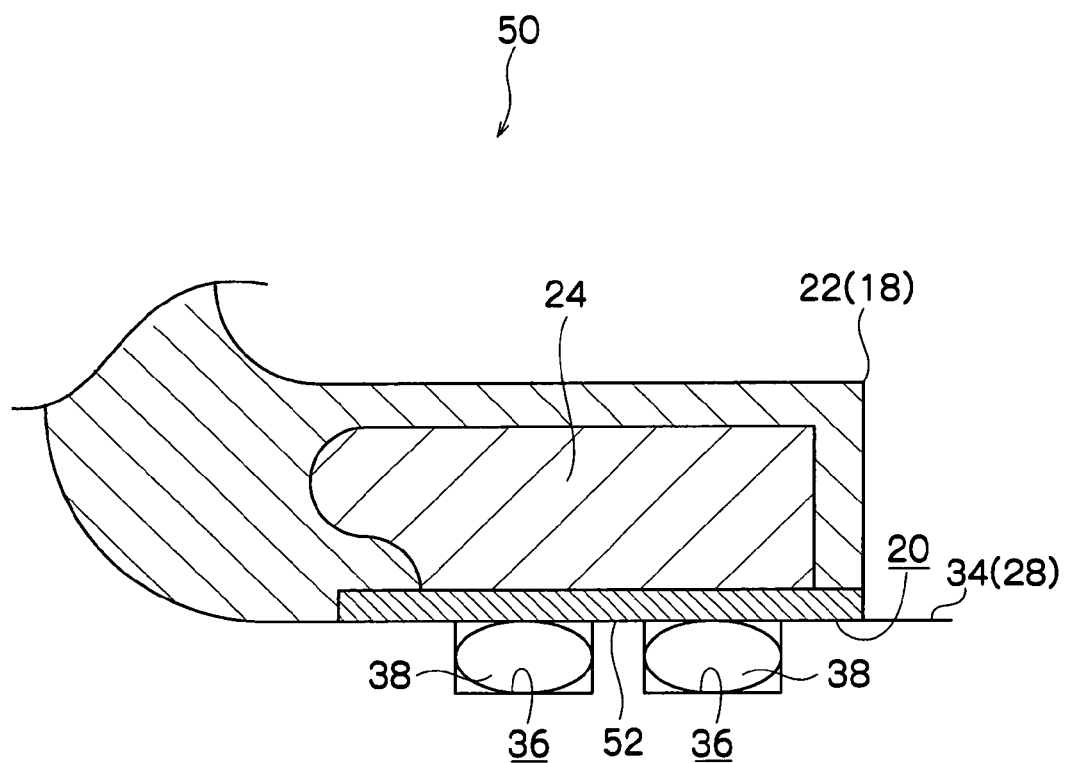
FIG. 5 is a sectional view illustrating the sealing state of a high-pressure tank pertaining to a second embodiment of the tank of the present invention.

FIG. 5 is a sectional view illustrating the sealing state of a high-pressure tank 50 pertaining to a second embodiment which has been configured by application of the tank of the present invention.

The high-pressure tank 50 pertaining to the present embodiment is configured substantially in the same manner as the high-pressure tank 10 pertaining to the first embodiment as described above, but is different with respect to the following point.

At the adjacent part 22 of the liner 18, a plastic ring 52 as a high-hardness part is provided on the inner circumference side of the backup ring 24 by insert molding. The plastic ring 52 constitutes the inner circumferential surface of the adjacent part 22, and is in contact with the respective O-rings 38. The plastic ring 52 is made of PA 12 ("3024GC6" manufactured by UBE INDUSTRIES, LTD.), which has a hardness (a plastic hardness in conformity with JIS) of 80 or higher, having a hardness higher than that of the liner 18. In addition, the backup ring 24 is disposed on the opposite side of the plastic ring 52 from the O-ring 38, functioning as a support part for supporting the plastic ring 52.

Figure 6:
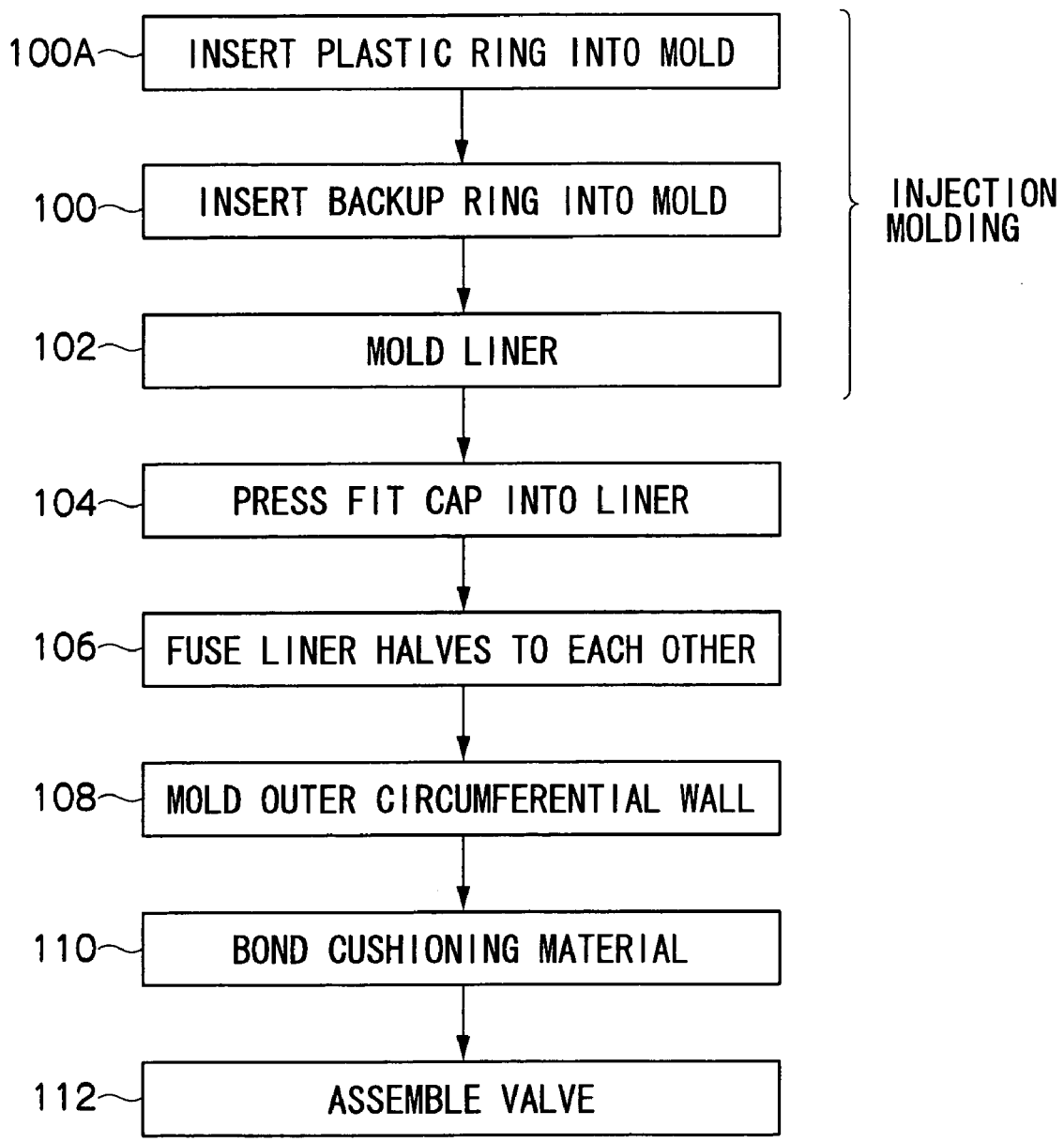
FIG. 6 is a flowchart illustrating the procedure for manufacturing the high-pressure tank pertaining to the second embodiment of the present invention.

The high-pressure tank 50 pertaining to the present embodiment is manufactured by the procedure illustrated in the flowchart in FIG. 6.

Particularly, at step 100A, the plastic ring 52 divided into two halves is inserted into a liner molding mold for molding the liner 18 in two halves. Then, in the same manner as in the above-described first embodiment, at step 100, the backup ring 24 divided into two halves is inserted into a liner molding mold; and at step 102, by injecting the molten resin into the mold for liner molding, the liner 18 divided into two halves is molded. In this case, because the liner 18 and the plastic ring 52 are both made of PA 12, the heat of the molten resin and the injection pressure cause the liner 18 and the plastic ring 52 to be fused to each other. In addition, this liner 18 divided into two halves is molded as a pair. The step 100 may be performed before the step 100A.

Further, in the same manner as in the above-described first embodiment, the steps 104, 106, 108, 110, and 112 are performed for manufacture of the high-pressure tank 50.

Figure 7:
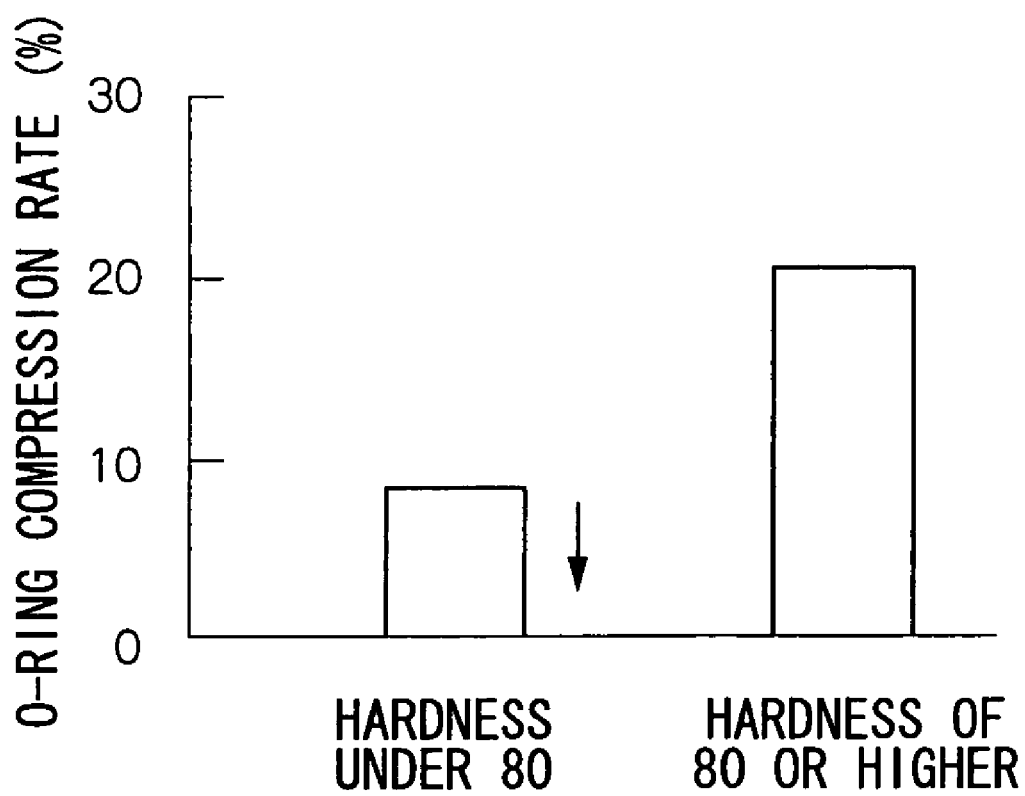
FIG. 7 is a graph showing the deformation rate for the respective O-rings in the high-pressure tank pertaining to the second embodiment of the present invention in comparison with that in a high-pressure tank where the plastic ring has a hardness of under 80.

Here, if the plastic ring 52 had a hardness under 80 as shown in FIG. 7, the deformation of the plastic ring 52 would prevent the respective O-rings 38 from being sufficiently compressed (at a rate of compression that is required for sealing).

However, in the high-pressure tank 50, the plastic ring 52 provided at the adjacent part 22 of the liner 18 has a hardness of 80 or higher, which is higher than that of the liner 18. Further, the plastic ring 52 is in contact with the respective O-rings 38. Moreover, the backup ring 24 provided at the liner 18 on the opposite side of the plastic ring 52 from the O-ring 38 has a hardness higher than that of the liner 18. Therefore, the respective O-rings 38 can be positively and sufficiently compressed (with a rate of compression of the respective O-rings 38 being as high as 20%), and thus reliable sealing between the liner 18 and the cap 28 can be provided.

In addition, when the pressure inside of the high-pressure tank 50 is increased to a high pressure, even if the valve 42 and the cap 28 are pushed out toward the outside, resulting in the protruded part 34 of the cap 28 being shrinkage-deformed toward the inside in the radial direction due to the stresses, the respective O-rings 38 can maintain the state of sealing between the protruded part 34 and the adjacent part 22. Therefore, reliable sealing between the liner 18 and the cap 28 can still be provided.

Third Embodiment

Figure 8:
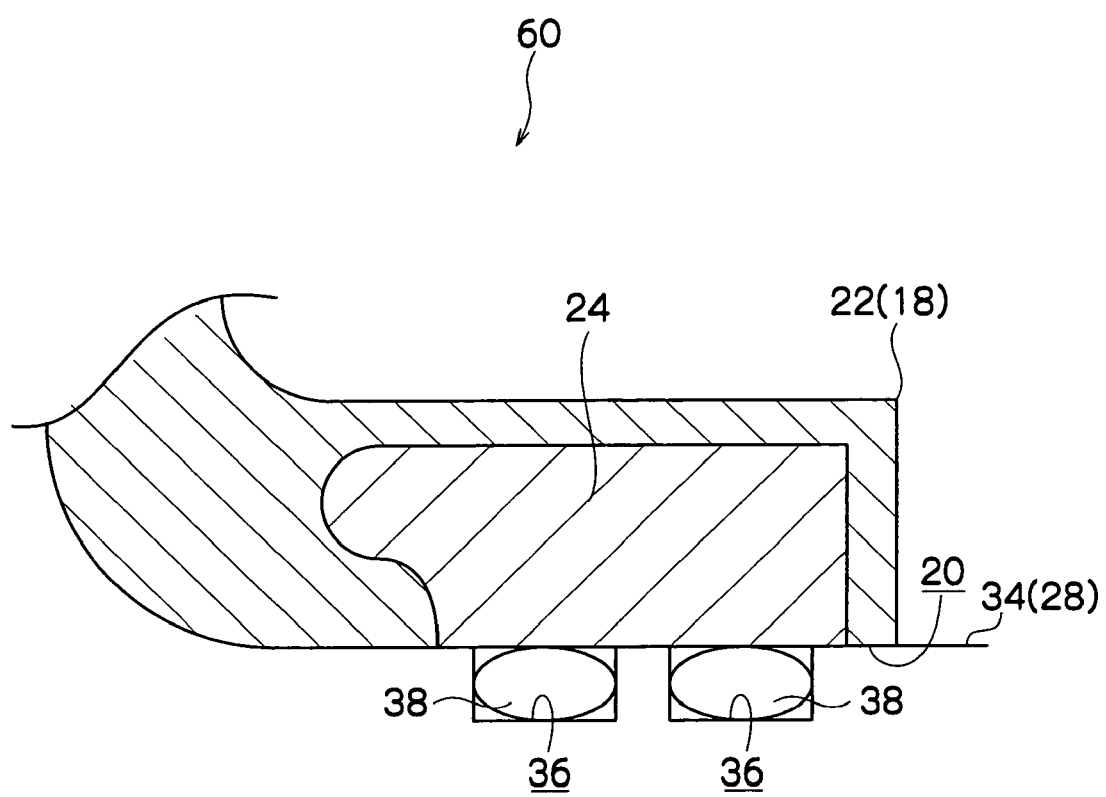
FIG. 8 is a sectional view illustrating the sealing state of a high-pressure tank pertaining to a third embodiment of the tank of the present invention.

FIG. 8 is a sectional view illustrating the sealing state of a high-pressure tank 60 pertaining to a third embodiment which has been configured by application of the tank of the present invention.

The high-pressure tank 60 pertaining to the present embodiment is configured substantially in the same manner as the high-pressure tank 10 pertaining to the first embodiment as described above, but is different with respect to the following point.

The backup ring 24 provided at the adjacent part 22 of the liner 18 constitutes the inner circumferential surface of the adjacent part 22, the backup ring 24 being in contact with the respective O-rings 38.

Figure 9:
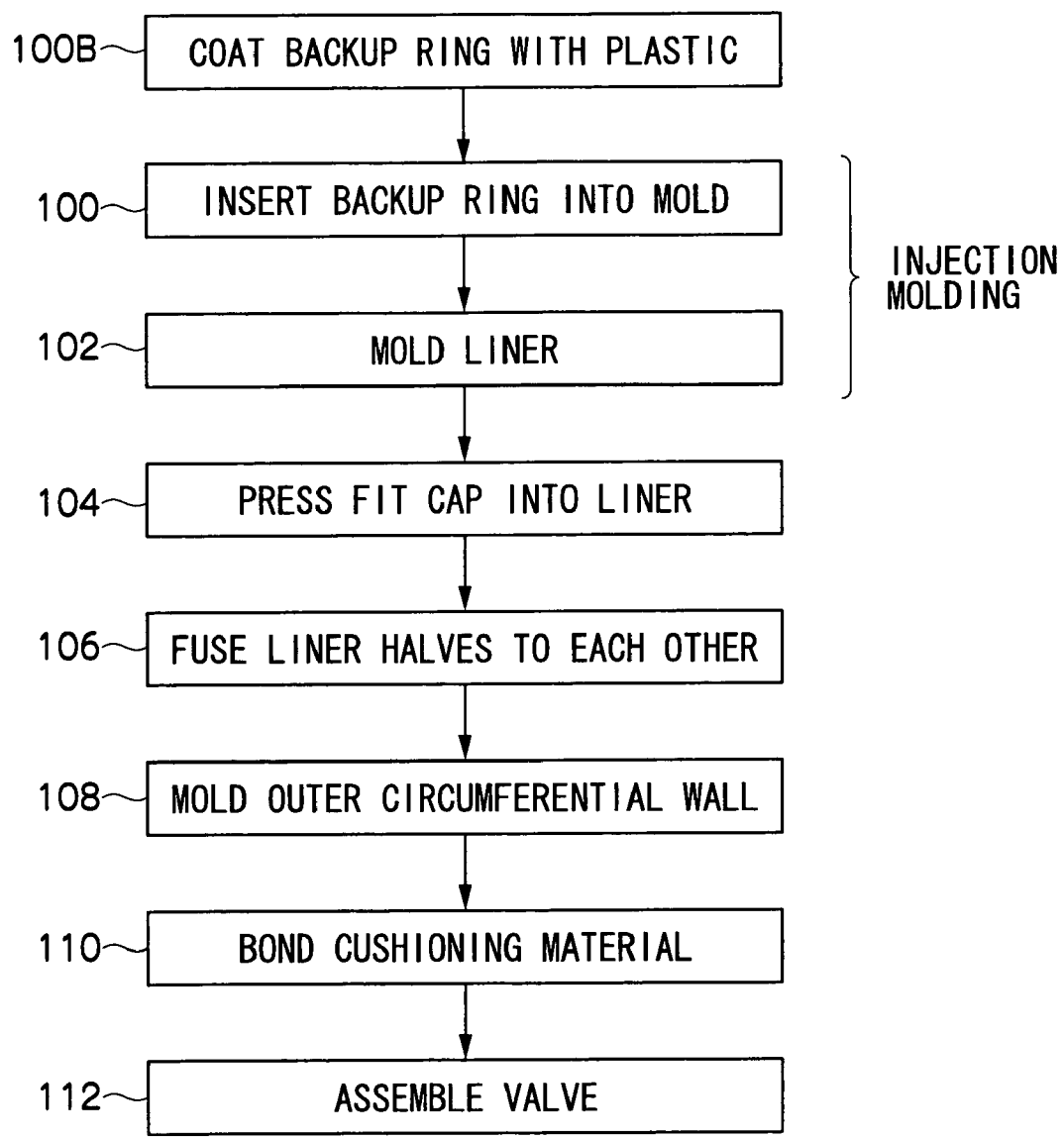
FIG. 9 is a flowchart illustrating the procedure for manufacturing the high-pressure tank pertaining to the third embodiment of the present invention.

The high-pressure tank 60 pertaining to the present embodiment is manufactured by the procedure illustrated in the flowchart in FIG. 9.

Particularly, at step 100B, the backup ring 24 is coated (subjected to resin coating treatment) with the same plastic as that for the liner 18 (PA 12 ("3030JI7" manufactured by UBE INDUSTRIES, LTD.)) to a thickness of 50 m. Then, in the same manner as in the above-described first embodiment, at step 100, the backup ring 24 divided into two halves is inserted into a liner molding mold for molding the liner 18 in two halves; and at step 102, by injecting the molten resin into the mold for liner molding, the liner 18 divided into two halves is molded. In this case, because the liner 18 and the coating resin for the backup ring 24 are both made of PA 12, the heat of the molten resin and the injection pressure cause the liner 18 and the backup ring 24 to be fused to each other. In addition, this liner 18 divided into two halves is molded as a pair.

Further, in the same manner as in the above-described first embodiment, the steps 104, 106, 108, 110, and 112 are performed for manufacture of the high-pressure tank 60.

In the high-pressure tank 60 configured as above, the backup ring 24 provided at the adjacent part 22 of the liner 18 has a hardness higher than that of the liner 18. Further, the backup ring 24 is in contact with the respective O-rings 38. Therefore, the respective O-rings 38 can be positively and sufficiently compressed (at a rate of compression of the respective O-rings 38 of as high as 30%), and thus reliable sealing between the liner 18 and the cap 28 can be provided.

In addition, when the pressure inside of the high-pressure tank 60 being increased to a high pressure, even if the valve 42 and the cap 28 are pushed out toward the outside, resulting in the protruded part 34 of the cap 28 being shrinkage-deformed toward the inside in the radial direction due to the stresses, the respective O-rings 38 can maintain the state of sealing between the protruded part 34 and the adjacent part 22. Therefore, reliable sealing between the liner 18 and the cap 28 can still be provided.

Further, the tank of the present invention is preferable for filling the inside thereof with a liquefied gas such as liquid hydrogen or the like for storage.

Please note that an aluminum liner can be employed for the liner described in the above embodiment.

What is claimed is:

1. A tank, comprising: a valve, and a tank main body having a container-like shape into which said valve is inserted, said tank main body having:
    a circumferential wall which is configured by integrating an outer circumferential wall on the outside and a liner on the inside except for the area around a through-hole that is formed in the circumferential wall; and
    a cap made of a metal that is fitted into said through-hole in said circumferential wall, wherein,
    at said liner, an adjacent part is formed as an integral part thereof, said adjacent part constituting an inner end portion of said through-hole;
    in the inside of the adjacent part, a high-hardness part having a higher hardness than the liner is provided;
    an inner end portion of said cap forms a protruded part that protrudes inwardly towards an inner side of the tank, and in an axial direction of the tank, and contacts the adjacent part of said liner; and
    a seal member being provided at an outer circumferential surface of said protruded part of said cap and an inner circumferential surface of the adjacent part of said liner.

2. The tank of claim 1, wherein said seal member is an O-ring formed in the shape of a torus with a circular cross-sectional geometry.

3. The tank of claim 1, wherein said outer circumferential wall is made of a fiber reinforced plastic.

4. The tank of claim 1, wherein said liner is made of polyamide.

5. The tank of claim 1, wherein the cap protrudes at the tank interior, and an acting direction of tank internal pressure acting on an internal seal portion of the liner is a radial direction of a valve cross section in which the valve is tightened.

6. The tank of claim 1, wherein the valve has two types of regions whose cross sectional areas viewed in an axial direction are different from each other, and a valve cross sectional area of a portion at which the valve and the cap are sealed is smaller than a valve cross sectional area of a portion at which the valve and the cap are screwed together.

7. The tank according to claim 1, wherein the liner is made of plastic.

8. The tank according to claim 1, wherein the through-hole has a substantially cylindrical shape.

9. The tank according to claim 1, wherein the through-hole has a substantially cylindrical shape, the cap has a substantially cylindrical shape, and the adjacent part is in the shape of a cylinder.

10. The tank of claim 1, the outer circumferential surface is formed in the shape of a torus with a triangular cross-sectional geometry and protrudes in a direction orthogonal to the axial direction of the tank.

11. The tank according to claim 1, further comprising a flange part that protrudes toward an outer side of the tank in a direction orthogonal to the axial direction of the tank.

12. The tank according to claim 1, wherein the high-hardness part is made of a metal.

13. The tank according to claim 1, wherein the adjacent part extends downwardly in a direction parallel to the axial direction of the tank.

14. The tank according to claim 1, wherein the high-hardness part is formed within the adjacent part and at least a portion thereof is enclosed by the adjacent part.

15. The tank according to claim 1, wherein a seal member is provided at least partially within an outer circumferential surface of the protruded part of the cap and between the outer circumferential surface of the protruded part and an inner circumferential surface of the adjacent part of the liner.

* * * * *